(12) United States Patent
Al-Mousa et al.

(10) Patent No.: US 10,700,791 B2
(45) Date of Patent: Jun. 30, 2020

(54) ON-BOARDING AND PROVISIONING DEVICES USING ULTRASONIC WAVE COMMUNICATIONS

(71) Applicant: Intel Corporation, Santa Clara, CA (US)

(72) Inventors: Yamin S. Al-Mousa, Santa Clara, CA (US); Assaf Mevorach, Portland, OR (US); Vijay Sarathi Kesavan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 15/086,785

(22) Filed: Mar. 31, 2016

(65) Prior Publication Data

US 2017/0288786 A1    Oct. 5, 2017

(51) Int. Cl.
*H04B 11/00* (2006.01)
*H04W 12/00* (2009.01)
(Continued)

(52) U.S. Cl.
CPC .......... *H04B 11/00* (2013.01); *H04W 12/003* (2019.01); *H04M 1/72527* (2013.01); *H04W 48/16* (2013.01)

(58) Field of Classification Search
None
See application file for complete search history.

(56) References Cited

U.S. PATENT DOCUMENTS 5,442,343 A * 8/1995 Cato .................. G06F 3/147
340/10.52
2013/0106975 A1  5/2013 Chu
(Continued)

FOREIGN PATENT DOCUMENTS

CN   103929767 A   7/2014
CN   104320804 A   1/2015
(Continued)

OTHER PUBLICATIONS

"International Application Serial No. PCT/US2017/018579, International Search Report dated Jun. 21, 2017", 3 pgs.
(Continued)

*Primary Examiner* — James P Duffy
(74) *Attorney, Agent, or Firm* — Schwegman Lundberg & Woessner, P.A.

(57) ABSTRACT

Techniques for communicating configuration information with remote devices using ultrasonic audio are disclosed. In an example, provisioning and device onboarding operations are initiated by a configuration computing device to a plurality of configurable devices, through operations that encode configuration data into an ultrasonic audio signal (e.g., emitted at 18 kHz or greater) and broadcast this ultrasonic audio signal with a speaker. The respective configurable devices may then perform operations to receive the ultrasonic audio signal with a microphone, decode the configuration data from the ultrasonic audio signal, and configure settings based on the configuration data. This configuration data may include network connection information to onboard the respective configurable devices to connection with a wireless local area network (e.g., a Wi-Fi network). This configuration data may also communicate information to enable the respective configurable device to access a provisioning server, used to obtain additional network or configuration settings.

25 Claims, 9 Drawing Sheets

(51) Int. Cl.
*H04M 1/725* (2006.01)
*H04W 48/16* (2009.01)

(56) References Cited

U.S. PATENT DOCUMENTS

| | | | |
|---|---|---|---|
| 2014/0146192 A1 | 5/2014 | Zhou et al. | |
| 2014/0340366 A1 | 11/2014 | Poulsen | |
| 2015/0120000 A1* | 4/2015 | Coffey | H04L 12/2803 700/13 |
| 2015/0131539 A1 | 5/2015 | Tsfaty et al. | |
| 2015/0185311 A1 | 7/2015 | Lohier | |
| 2016/0072806 A1 | 3/2016 | Kim et al. | |

FOREIGN PATENT DOCUMENTS

| | | |
|---|---|---|
| CN | 109075871 A | 12/2018 |
| WO | WO-2015192309 A1 | 12/2015 |
| WO | WO-2017172109 A1 | 10/2017 |

OTHER PUBLICATIONS

"International Application Serial No. PCT/US2017/018579, Written Opinion dated Jun. 21, 2017", 8 pgs.

"Guest Mode FAQs", Chromecast Help, [Online]. Retrieved from the Internet: <URL: https://support.google.com/chromecast/answer/6109297?hl=en&ref_topic=6109288, (2016), 4 pgs.

Petroff, Matthew, "Amazon Dash Button Teardown", [Online]. Retrieved from the Internet: <URL: (https://cdn5.mpetro??.net/wp-content/uploads/2015/05/dash00-box.jpg), (May 24, 2015), 23 pgs.

"International Application Serial No. PCT/US2017/018579, International Preliminary Report on Patentability dated Oct. 11, 2018", 10 pgs.

"European Application Serial No. 17776132.7, Extended European Search Report dated Oct. 28, 2019", 8 pgs.

"European Application Serial No. 17776132.7, Response filed Dec. 18, 2019 to Extended European Search Report dated Oct 28, 2019", 14 pgs.

"European Application Serial No. 17776132.7, Communication pursuant to Article 94(3) EPC dated Mar. 23, 2019", 6 pgs.

* cited by examiner

ON-BOARDING AND PROVISIONING DEVICES USING ULTRASONIC WAVE COMMUNICATIONS

TECHNICAL FIELD

Embodiments described herein generally relate to wireless communication techniques used among electronic devices and, for some examples, the use of sound waves to perform configuration operations such as on-boarding and provisioning with remote devices.

BACKGROUND

The Internet of Things or "IoT" is a network of physical objects or "things" embedded with electronics, software, and sensors which enables these objects to collect and exchange data between themselves and between other computing devices. Example "things" include connected home appliances, sensors in automobiles, biochips, and like smart devices. It is estimated that by 2050, billions of IoT smart devices will be used for automating some of our daily routines and facilitating smarter interactions with electronic devices.

One of the first steps in installing a smart device often involves setting up the device, such as "on-boarding" the device to connect to a Wi-Fi network, or "provisioning" the device to a particular configuration or setup. Some IoT device manufacturers provide human control interfaces on the smart device that may be used for initial configuration. Other approaches utilize dedicated applications (such as smart phone applications) to communicate with the IoT device using proprietary messaging to push configuration details.

While on-boarding or provisioning one IoT device may be a relatively simple or straightforward operation, on-boarding and provisioning in the case of large scale devices installations (e.g. installing several hundreds/thousands of sensors or actuators such as light bulbs) is often a laborious, error-prone, and manual task, and may result in significant operational expenditure. Many approaches to onboarding and provisioning devices are based on configuring and installing one device at a time, which does not scale efficiently for larger installations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
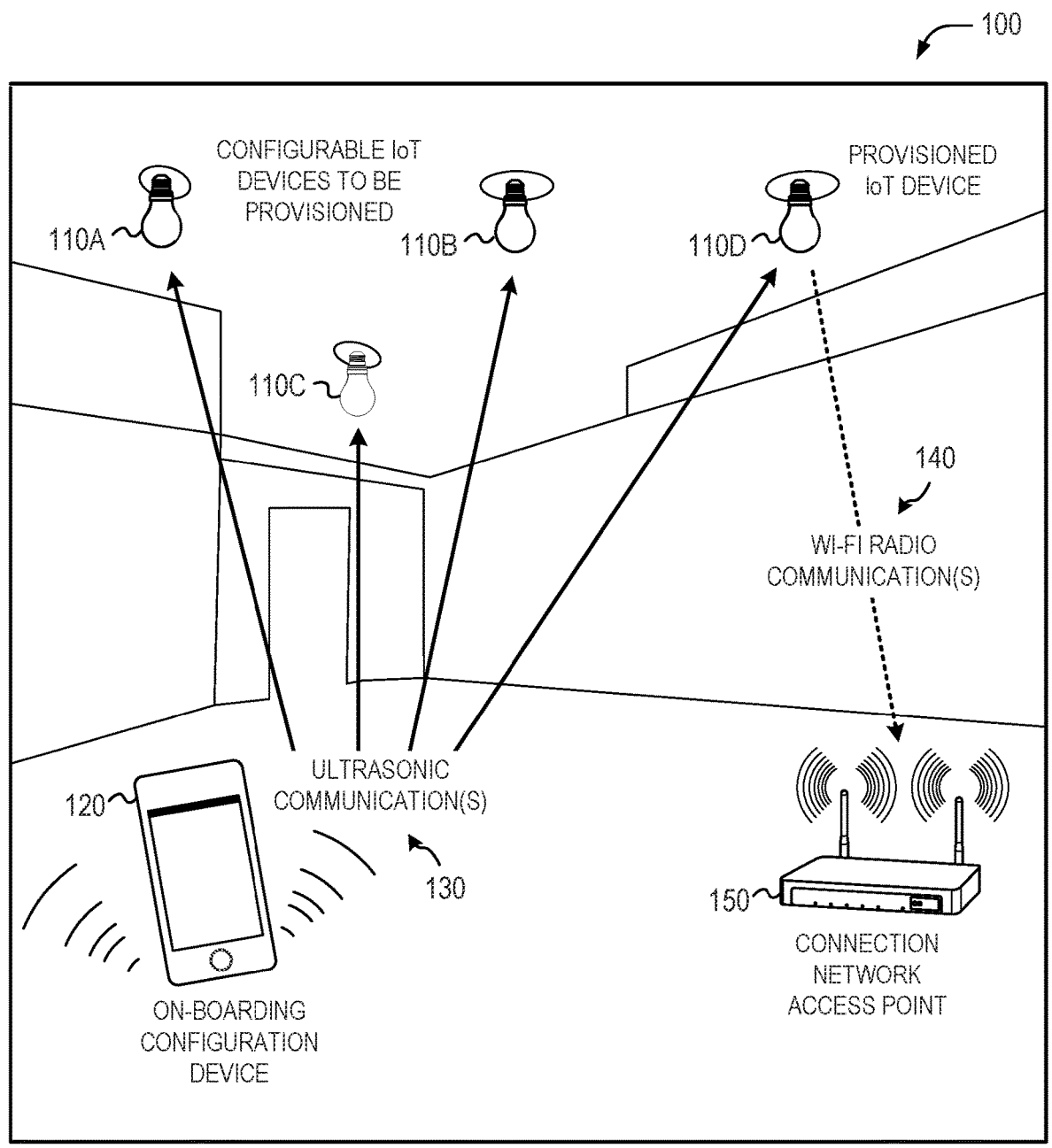
FIG. 1 illustrates an overview of an operational environment for communicating connectivity details for a plurality of configurable devices, according to an example.

In the following description, methods, configurations, device components, and related apparatuses are disclosed that provide communication and configuration of remote devices using ultrasonic (e.g., over 18 kHz) or high-frequency (e.g., between 12 kHz and 18 kHz) acoustic sound waves, or like forms of communicated, wireless mechanical wave energy. Specifically, the following description includes various examples of the use of ultrasonic sound waves to provide configuration details to a remote device, such as to provision settings of a configurable device and onboard the device to a particular network. As a result, the following uses of ultrasonic communication enable the distribution of configuration information, device operation settings, and other data to a plurality of devices.

In an example, the presently described techniques and configurations are applied to provide provisioning of network connection settings in a configurable IoT device, such as wireless network settings indicating a Wi-Fi connection network, security key, and like configuration parameters. A configurable IoT device may receive and implement data decoded from a modulated ultrasonic wave signal that contains such wireless network settings, to begin wireless network operations. Further, these network connection settings may be simultaneously broadcast for concurrent provisioning and onboarding of multiple devices (thus reducing the number of communications and processing time to complete such provisioning and onboarding).

As further discussed herein, techniques are disclosed to provide for the generation, transmission, receipt, and processing of configuration data between a configuration device (e.g., a configurable device operating as a "master" or controlling, source device) and a configurable device (or, a plurality of configurable devices, e.g., operating as "slave" or controllable, destination devices) via ultrasonic communications.

The use of ultrasonic waves as an out-of-band channel to on-board and provision configurable slave devices provides an improvement over traditional out-of-band channels such as near-field communications (NFC) or Bluetooth low energy (BLE), by allowing a configuration master device to perform a mass on-board operation and provision numerous devices in audio proximity (bounded by the vicinity of an area that can observe and decode the data of the acoustic wave). Further, the physical distance limitations of sound transmission via ultrasonic acoustic waves may also provide security benefits and broadcasting range limitations that may not be provided by RF radio communications.

Some of the factors that contribute to the challenges of on-boarding or provisioning IoT devices in an installation or deployment environment include the accessibility of the device, the processing or interface capabilities of the device, and the number of devices to be configured. For example, many IoT devices lack a human-friendly interface that can be used for initial device configuration or to enable configuration bootstrapping. Many IoT or other devices such as a smart light bulb do not include a human-readable interface on the device to receive detailed configuration settings or data values; in some cases, such devices may not include any physical user controls to change modes of the device.

Other approaches for configuration of an IoT device, and in particular for a configuration of a plurality of IoT devices, often involve individual communication to respective devices with the use of external interfaces or specialized programming commands. An approach for pre-loading devices with configuration and installation environment details during manufacturing is often cumbersome or impractical for specific deployments of a device. Further, using a common set of preconfigured credentials during manufacturing may expose security vulnerabilities and the use of undesirable configurations.

The presently disclosed uses of ultrasonic wave communications provides control and implementation for onboarding and provisioning operations, such as for the configuration of wireless network settings, in addition to the implementation of other types of configuration settings. Although the terms onboarding and provisioning may often refer to the same result or procedure, as used herein, "onboarding" or "on-boarding" refers to the configuration of a device for purposes of connecting to (on-boarding) a particular communication network, such as a wireless communication network; "provisioning" refers to the configuration of a device to enter an operational mode, such as a functional network communication mode provided through the implementation of communication network settings, or a mode resulting from implementing other device operation and control settings.

This disclosure provides numerous references to "ultrasonic" audio, defined herein as above the typical level of human hearing to be unobtrusive or unperceivable by a human, such as for sound emitted in a frequency range above 18 kHz. It will be understood, however, that the range of available acoustic signals which may be used with the present techniques may depend on the characteristics of the transmitting audio source (e.g., speaker) and the receiving audio destination (e.g., microphone). Further, the following examples that provide reference to ultrasonic audio waves may also apply to the use of high-frequency human-perceivable acoustic waves, such as infrasonic acoustic waves between 12 kHz and 18 kHz. Additionally, it will be understood that the following references and examples to ultrasonic audio may be performed with other forms of communicated, wireless mechanical wave energy across various mediums (gases, liquids, and solids), and thus the following references and examples are not limited to specific forms of ultrasonic audio or acoustic waves.

FIG. 1 illustrates an overview of an operational environment 100 for communicating connectivity details for a plurality of configurable devices 110A, 110B, 110C, 110D, according to an example use of ultrasonic communications 130 from an onboarding configuration device 120. It will be understood that additional devices and communications not depicted in FIG. 1 may be used to implement the following processing and communication techniques.

The configurable devices 110A, 110B, 110C, 110D, depicted as respective light bulbs, are devices that include respective control and communication circuitry to perform one or more functions (e.g., to control an LED array that emits light). The configurable devices 110A, 110B, 110C, 110D may be configurable to receive control commands via a communication network, such as a Wi-Fi network (e.g., a network implementing a protocol from the IEEE 802.11 standards family). For example, the configurable devices 110A, 110B, 110C, 110D may operate to power on/off, change mode or color, or the like in response to control commands received via the communication network.

The configurable devices 110A, 110B, 110C, 110D may respectively include an integrated, on-board, or coupled microphone to receive acoustic waves (audio) in proximity to the respective device. The process of provisioning the configurable devices 110A, 110B, 110C, 110D may include providing configuration data via ultrasonic waves to the respective devices to establish the network connectivity information for the Wi-Fi network, such as SSID name, security settings, security keys or certificates, IP addresses or DHCP and DNS settings, and the like. In a further example, the microphone may be external to the configurable device (e.g., coupled to the device via a USB dongle) during the initialization/on-boarding stage, such as in a scenario where the microphone is added temporarily to permit initial on-boarding and then removed when on-boarding is complete.

The onboarding configuration device 120 may be a desktop or notebook personal computer (PC), a tablet, a smartphone, a wearable device, or other form factor of a computing device including an integrated or separate display screen. The onboarding configuration device 120 may include one or more input devices (such as a touch screen, home or function control button, and microphone) and output devices (such as a display screen and speaker), and a communication device (such as Wi-Fi or cellular network communication circuitry). The onboarding configuration device 120 may be configured to generate ultrasonic sound waves in one or more ultrasonic communications 130 that communicate configuration data for network configuration operations. For example, this broadcast may include modulated onboarding/provisioning details to perform onboarding and provisioning of respective listening devices.

The configuration device used for on-boarding may include a human operable interface, an audio generation device, and a speaker capable of emitting ultrasonic waves above 18 kHz (or another defined high-frequency range). The IoT device (to be provisioned) includes a microphone capable of capturing audio above 18 kHz (or another defined high-frequency range) and has enough computing and processing power to decode recorded ultrasonic sound—a capability that is provided by many IoT devices.

Modulated ultrasonic sound waves may be emitted by the onboarding configuration device 120, with the onboarding configuration device 120 enabling the user to specify, select, or obtain the configuration parameters for on-boarding and provisioning. Additionally, the configurable devices 110A, 110B, 110C, 110D may be pre-programmed to enter a provisioning mode or state during which the respective configurable device listens and decodes the configuration details encoded in the ultrasonic communications 130. The configurable device 110A, 110B, 110C, 110D also may be factory-set to an initial network on-boarding mode or state, changed by a human or automated control to enter the initial network on-boarding state, or may enter the initial network on-boarding state in response to detection of a particular sound frequency or pattern. The configurable device 110A, 110B, 110C, 110D accordingly may use the extracted configuration details to connect to an indicated network, such as a Wi-Fi network.

In response to the receipt of the ultrasonic communications 130, a configurable device may process, implement, and use the configuration information. For example, this is shown with the operations performed by configurable device 110D, which uses the wireless network connection data to connect to a Wi-Fi connection network provided by access point 150. The configurable device 110D (which has been onboarded to the Wi-Fi connection network) may then exchange Wi-Fi communications 140 with the access point 150 and proceed to continue operation in a provisioned state.

Although FIG. 1 depicts configurable devices 110A, 110B, 110C, 110D as light bulbs, it will be understood that a variety of other device types and form factors may be provided as a configurable device for use with the depicted ultrasonic communications 130. Additionally, the configurable devices 110A, 110B, 110C, 110D may be provisioned for operation with other types of wired and wireless networks, including long range (e.g., cellular) communication networks, short range (e.g., Bluetooth/BLE) radio communication networks, power line networks, and the like. Further, although the configurable devices 110A, 110B, 110C, 110D may each include a microphone, sensor, output device, and processing units directly with the respective devices, it will be understood that such capabilities may be distributed or provided in device groups for provisioning and configuration of reduced function IoT devices.

Figure 2:
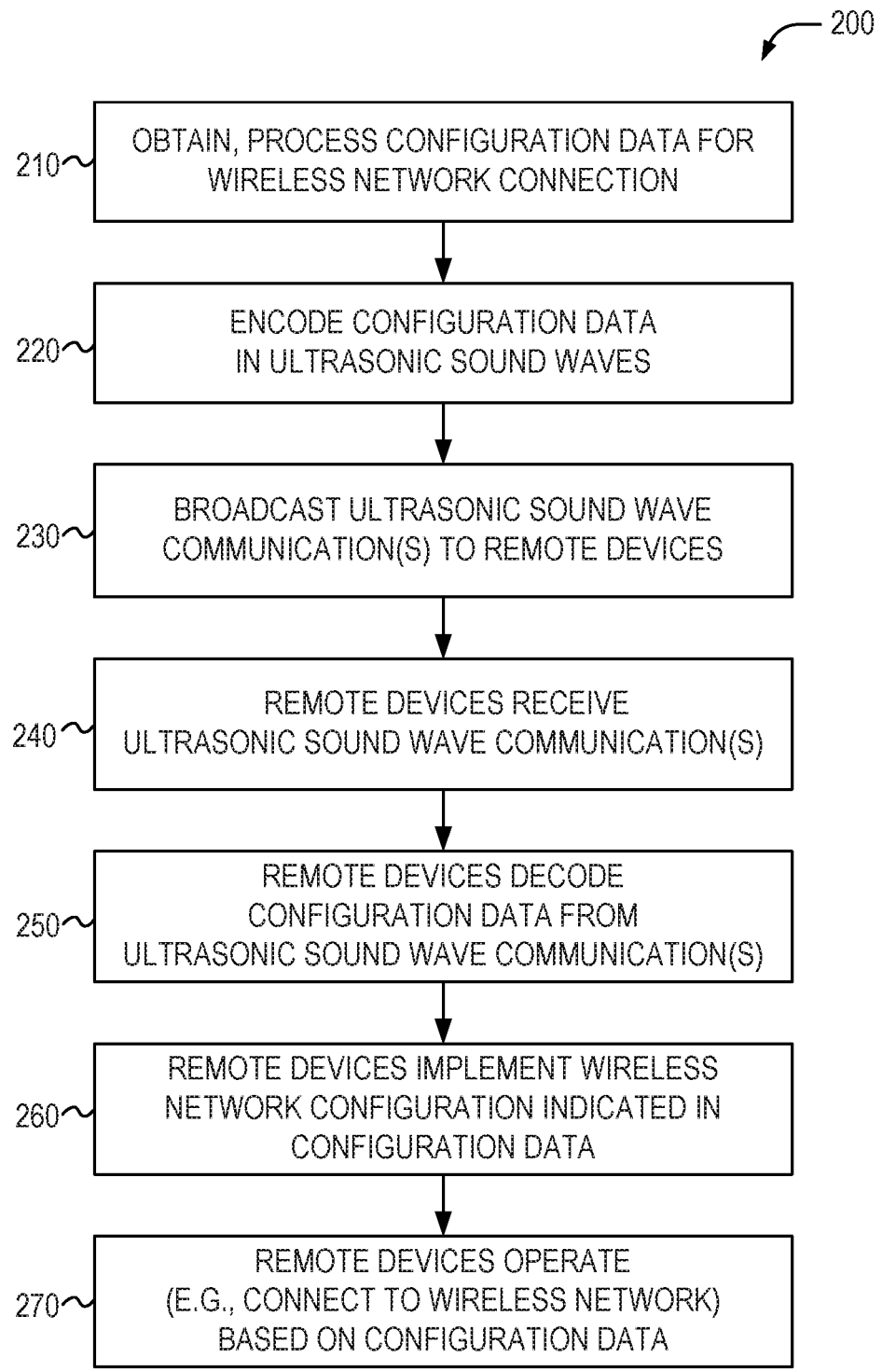
FIG. 2 illustrates a flowchart of operations for provisioning wireless network connection information in a plurality of configurable devices, according to an example.

FIG. 2 illustrates a flowchart 200 of operations for provisioning wireless network connection information in a plurality of configurable devices, in a further example based on the operational environment 100 depicted in FIG. 1. The operations in the flowchart 200 are portrayed from the perspective of system operations performed among a configuration device (e.g., the onboarding configuration device 120) and a remote device (e.g., one of the configurable devices 110A, 110B, 110C, 110D). The system operations may be assisted, however, through the use of human or automated activities, or additional devices and subsystems.

The flowchart 200 specifically enables the targeting of IoT device installations to environments that have a limited number of configuration parameters to communicate or configure, such as basic consumer environment parameters for Wi-Fi connections (for example, a known SSID name and a pre-shared key value for WEP, WPA or WPA2-Personal security types). The operations of flowchart 200 include obtaining and processing such configuration data for a Wi-Fi wireless network connection (operation 210) at a configuration device. Based on the configuration data values, the configuration device (an "onboarding" device) encodes (e.g., modulates) the configuration parameters in ultrasonic sound waves (operation 220). These ultrasonic sound waves are then output by a speaker controlled by the configuration device, to broadcast the ultrasonic sound waves to remote devices within audio range (operation 230). Because the ultrasonic sound wave communication broadcast is unidirectional, the configuration device may repeat the transmission of the ultrasonic modulated wave several times to maximize the probability of successful decoding by the respective IoT remote devices.

The respective remote devices use a microphone listen to and receive the ultrasonic sound wave communications (operation 240), followed by the remote devices decoding the configuration parameters from the sound wave communications (operation 250). The remote devices then implement the configuration parameters by implementing a wireless network configuration indicated in the configuration data (operation 260). The remote devices further use this wireless network configuration to operate and connect to another wireless network, such as a Wi-Fi network in range, based on the configuration data (operation 270).

With the transmission of these ultrasonic sound waves in a broadcast medium, multiple IoT devices may be onboarded to a wireless network and provisioned simultaneously. This is in contrast to other onboarding approaches, such as those used with many ZigBee/Z-Wave devices, which employ a user-actuated push button mechanism to initiate the on-boarding process. Such simultaneous actuation of a push button mechanism may not be possible or feasible for large deployments, or deployments of devices in inaccessible areas.

Figure 3:
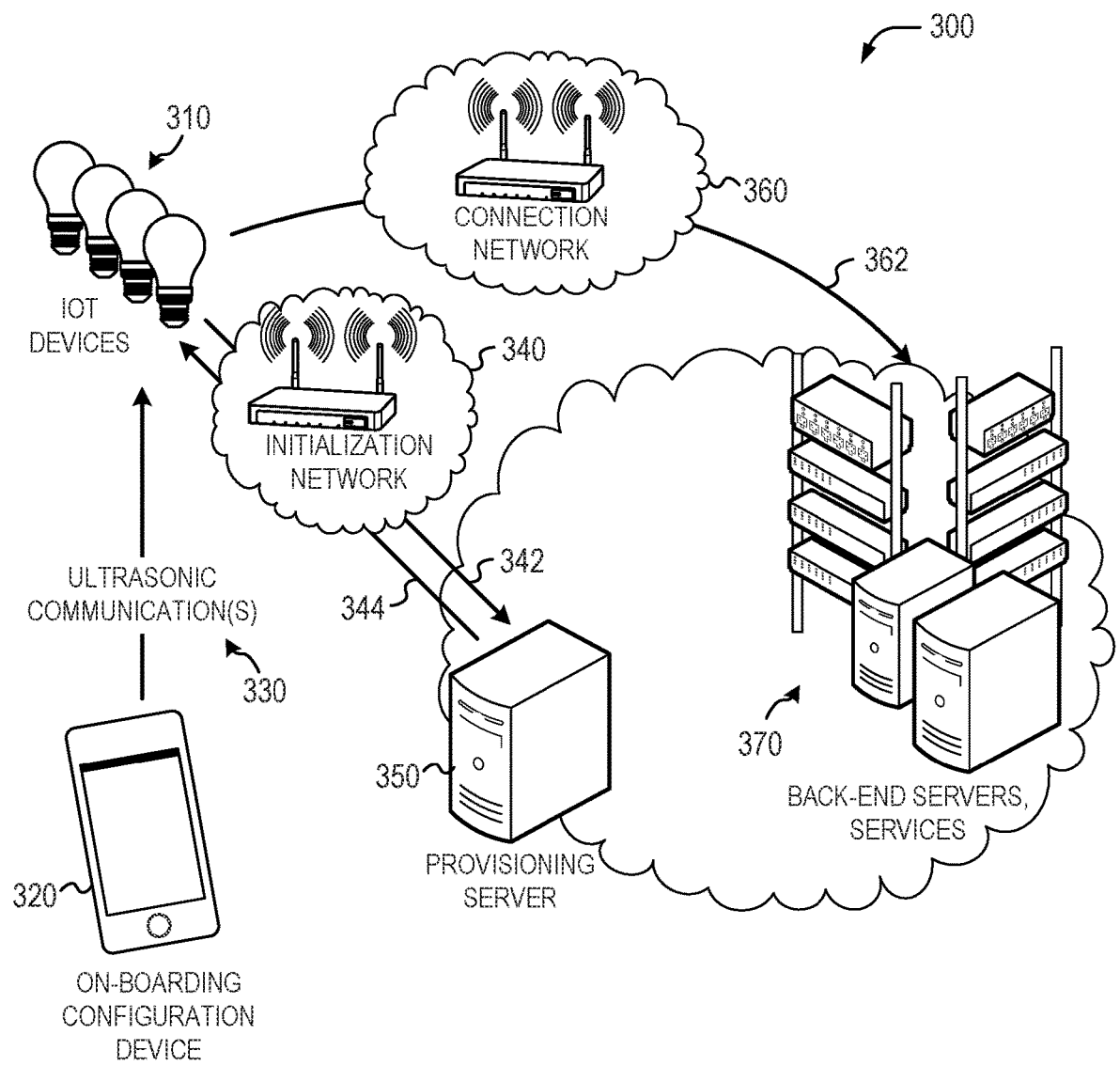
FIG. 3 illustrates an overview of an operational environment for communicating connectivity details for a plurality of configurable devices, with use of a first provisioning network and a second connection network, according to an example.

In a further example, a second mode of operation may be used for an advanced deployment environment, such as an enterprise-based installation environment that deploys additional configuration settings. FIG. 3 illustrates an overview of an operational environment 300 for communicating connectivity details for a plurality of configurable devices according to an example. This operational environment 300 specifically illustrates a scenario to obtain (and implement) additional configuration parameters for a plurality of configurable IoT devices 310 without restarting the on-boarding and provisioning process.

The environment depicted in FIG. 3 includes a two-part procedure: an initial network onboarding via ultrasonic communications 330, to instruct the configurable IoT devices 310 to use an initialization (first) wireless network 340; and further configuration of the configurable IoT devices 310 with information from a provisioning server 350 to use a connection (second) wireless network 360. Similar to the scenario in FIG. 1, the on-boarding configuration device 320 (e.g., a smartphone or like computing device) broadcasts one or more ultrasonic communications 330 to the configurable IoT devices 310. The various configurable IoT devices 310 process the first configuration information provided by these ultrasonic communications 330 to then obtain second, additional configuration information for another network (or a more advanced configuration for the same network).

The ultrasonic communications 330, in this example, are not used to transfer a complete set of network communication parameters (such as security parameters) with the ultrasonic communications. Depending on a modulation and encoding scheme, transmitting small amounts of data with the ultrasonic communications may take multiple seconds (or longer), especially with modulation techniques that may only transfer a limited number of bytes per second. Thus, sending an extensive list of configuration parameters and configuration data would take a long time and increase chances of an error or an unsuccessful configuration. (Additionally, re-broadcasting and repeating attempts would consume a significant time when attempting to transmit all configuration parameters used in an advanced configuration.)

The configuration scenario depicted in FIG. 3 may be used to allow the configurable IoT devices 310 to connect to networks with complex configurations or advanced security parameters. For example, such network configurations may involve the use of security certificates, keys, policies, or connection parameters.

As shown, the on-boarding configuration device 320 encodes and modulates the initial configuration parameters that are used to onboard the configurable IoT devices 310 onto the initialization network 340 (e.g., an on-boarding network). The configurable IoT devices 310 may use the decoded parameters to access the initialization network 340, and transmit a request 342 for an up-to-date, extensive list of configuration parameters of another connection network. A provisioning server 350 (e.g., an on-site server) provides a response 344 to the request 342 via the initialization network 340, including detailed configuration parameters.

The configurable IoT devices 310 may use the configuration parameters provided in the response 344 to onboard and provision onto the final installation environment, such as to establish a network connection via a connection network 360. In a further example, the provisioning server 350 may be accessed to update configuration parameters as needed, such as to allow the configurable IoT devices 310 to pull updates at defined intervals at future times.

With a configuration to utilize the connection network 360, the now-provisioned configurable IoT devices 310 may operate to access network resources such as back-end servers and services 370 with a connection 362 via the connection network 360. For example, the configurable IoT devices 310 may be configured to access a logging or control service within the back-end servers and services 370. Additional data and communications to provision, configure, update, or modify the IoT devices may be implemented by the provisioning server 350 or the back-end servers and services 370.

Figure 4:
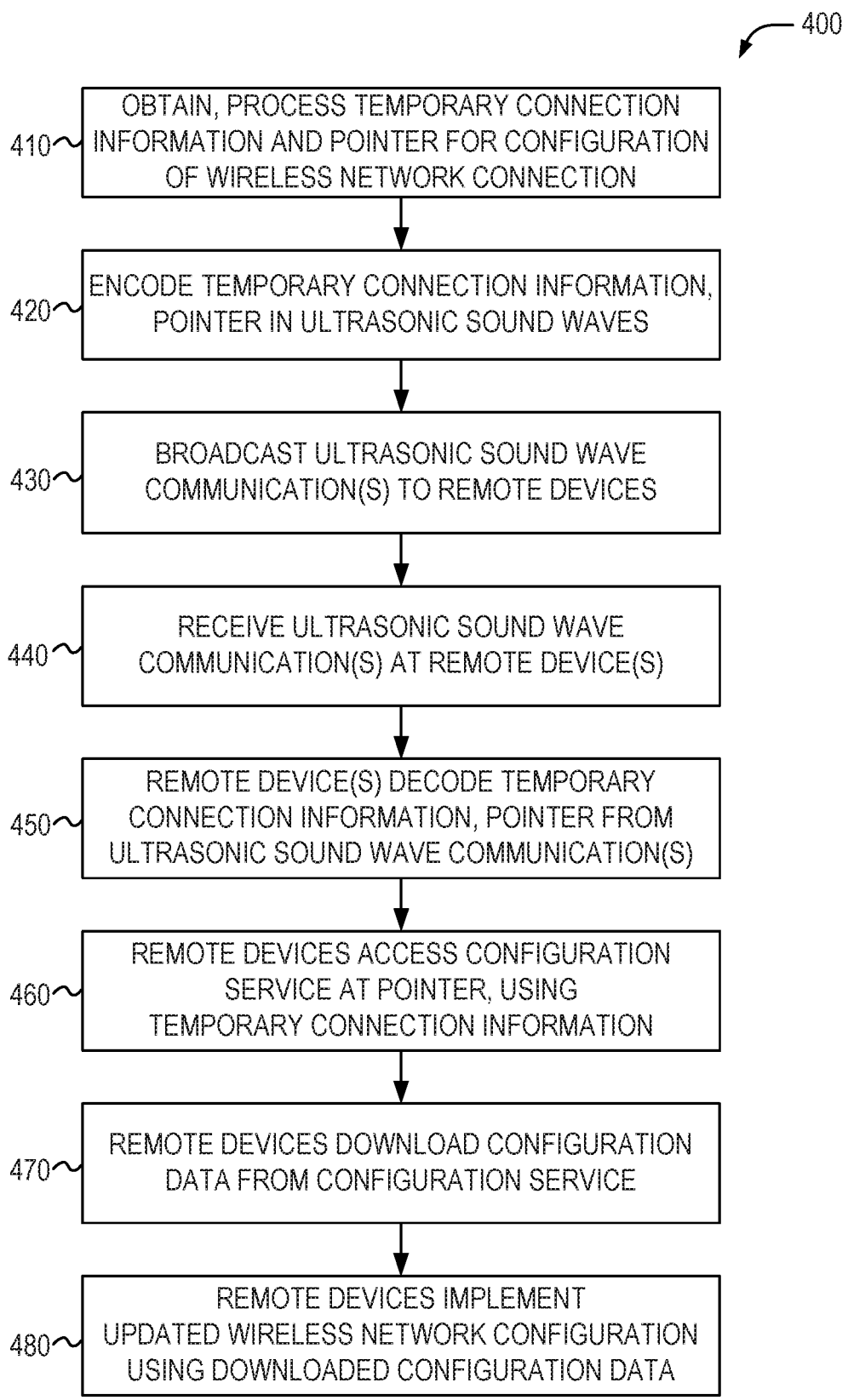
FIG. 4 illustrates a flowchart of operations for provisioning wireless network connection information in a plurality of configurable devices using a configuration service, according to an example.

FIG. 4 illustrates a flowchart 400 of operations for provisioning wireless network connection information in a plurality of configurable devices using a configuration service. The flowchart 400 depicts the targeting for an installation of configurable remote devices to additional network configuration parameters, such as in the scenario depicted in FIG. 3. For example, such network configuration parameters may include the receipt of a configuration for a WPA2-Enterprise Wi-Fi network using a CA-rooted certificate chain, or a configuration for network addresses and settings of backend cloud services. Such services may be used to log IoT data and accept remote commands that are common requirements for enterprise Wi-Fi deployments of IoT devices.

The operations of the flowchart 400 include operations performed by a configuration device to obtain and process temporary connection information (e.g., for establishing a connection to an initialization network) and a reference (e.g., an internet or network address) for a configuration of the wireless network connection (operation 410). This reference may be a URL to a local or remote web service, such as the provisioning server 350 depicted in FIG. 3. The configuration device further encodes the temporary connection information and reference in ultrasonic sound waves (operation 420) and broadcasts the ultrasonic sound wave communications to listening remote devices (operation 430).

The configurable remote devices receive the ultrasonic sound wave communications (operation 440) and decode the temporary connection information and the reference from the ultrasonic sound wave communications (operation 450). The remote devices then may access an onboarding network using the temporary network information, and then access the configuration service (e.g., provisioning service) via the onboarding network using the reference (operation 460). With this access, the remote devices may download or receive configuration data from the configuration service (operation 470) (e.g., a provisioning server) and then implement an updated device or wireless network configuration (operation 480). For example, an updated wireless network configuration may be used by the remote device to access various services and networks, placing the respective remote devices in a provisioned state.

Thus, in addition to the minimum requirements for the configuration of FIG. 2, the advanced configuration of FIG. 4 may use a temporary, on-boarding network to initially onboard IoT devices. Then, such IoT devices may contact an on-site provisioning server (with the address of this provisioning server being one of the configuration parameters provided in the initial configuration mode), as the devices retrieve remaining or additional configuration parameters from the provisioning server to complete onboarding and provisioning for an installation environment. In addition to network configuration data, other forms of configuration data may be obtained from the provisioning server. Further, features of the provisioning server may be implemented as part of an SDK or service, or as part of various application programming interfaces (APIs) and data services for a back-end server.

Ultrasonic audio waves generally do not penetrate walls, or are muffled and not decipherable when such waves penetrate walls. Thus, only devices in the same vicinity as the ultrasonic audio broadcast (usually in close proximity or in the same room) would be able to capture and decode the ultrasonic messages. This adds security against eavesdropping or and reduces a possibility that IoT devices could be hijacked or tampered with during configuration time.

Figure 5:
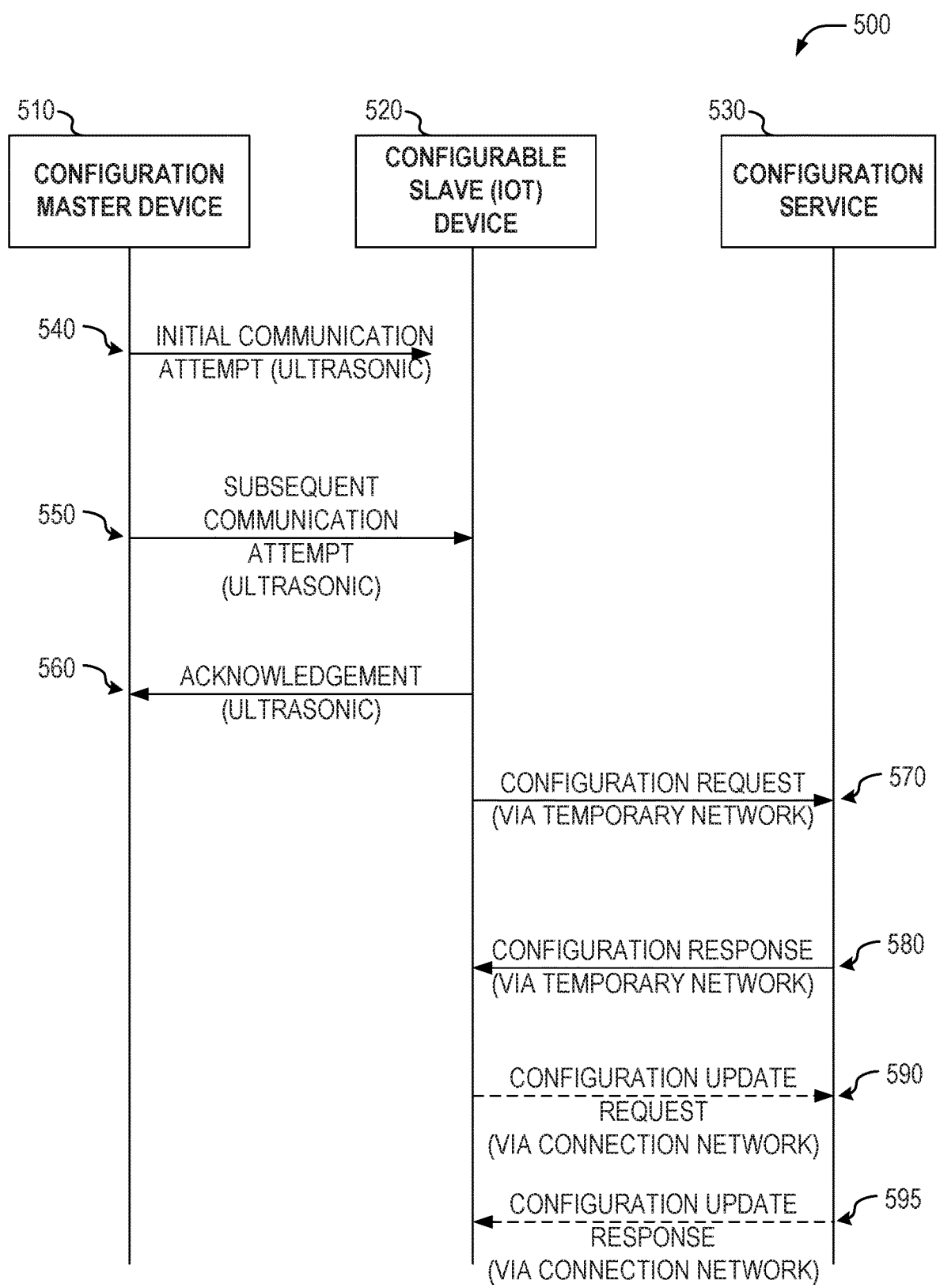
FIG. 5 illustrates a communication diagram with communications among a configuration master device, a configurable slave device, and a configuration service, according to an example.

FIG. 5 illustrates a communication diagram 500 with communications exchanged among a configuration master device 510, a configurable slave device 520, and a configuration service 530, such as with use of an on-boarding configuration device, configurable IoT device, and provisioning server described above. Thus, the communications depicted in FIG. 5 may be implemented as described above in FIGS. 1 to 4, with FIG. 5 depicting the use of multiple communication attempts (multiple broadcasts) and a communication acknowledgement.

As shown, the configuration master device 510 may provide repeated attempts to deliver a modulated ultrasonic sound wave message to receiving devices, such as with an initial communication attempt 540 and a subsequent communication attempt 550. As shown in the example of FIG. 5, only the subsequent communication attempt 550 successfully reaches the configurable slave device 520. In response to successfully decoding the message, the configurable slave device 520 may provide an acknowledgment 560 emitted via an ultrasonic wave communication. In another example, the acknowledgement 560 can be provided over other networks such as the newly on-boarded Wi-Fi network. (For example, the configurable slave device 520 may register itself with a backend logging server that notifies the configuration master device 510 that the particular device was on-boarded).

In a further example, in cases where the ultrasonic channel is known to be bi-directional (such as for configuration between an onboarding device and IoT devices that each have a speaker and microphone), then subsequent communication attempts 550 to repeat the modulated ultrasonic message may be replaced with the use of acknowledgements. Additionally, in some examples, error detection mechanisms may be used by the configurable slave device 520 to signal a successful or unsuccessful reception of data in the subsequent communication attempt 550; in like examples, error correction mechanisms may be used to increase the probability of successful decoding.

FIG. 5 further illustrates the configuration of the configurable slave device 520 through a configuration request 570 sent via a temporary network to a configuration service 530, and a configuration response 580 also sent via this temporary network from the configuration service 530 to the configurable slave device 520. Additional requests and communications among the configuration service 530 and the configurable slave device 520 via a temporary (e.g., provisioning) or a permanent (e.g., connection) network may be used for subsequent configuration or re-configuration of the configurable slave device 520. Responsive to receiving the configuration response 580, the configurable slave device 520 may implement appropriate configuration data and operations. In further examples, the configurable slave device 520 may be configured (or may be triggered) to request updated configuration data after the configurable slave device 520 has been provisioned or configured. For example, a device may request/poll the configuration service 530 periodically, such as with a configuration update message 590 to pull the latest or updated configuration data or to verify that the latest or updated configuration data is loaded; the configurable slave device 520 may receive a configuration update response message 595, which indicates an updated configuration information or a confirmation in response.

Figure 6:
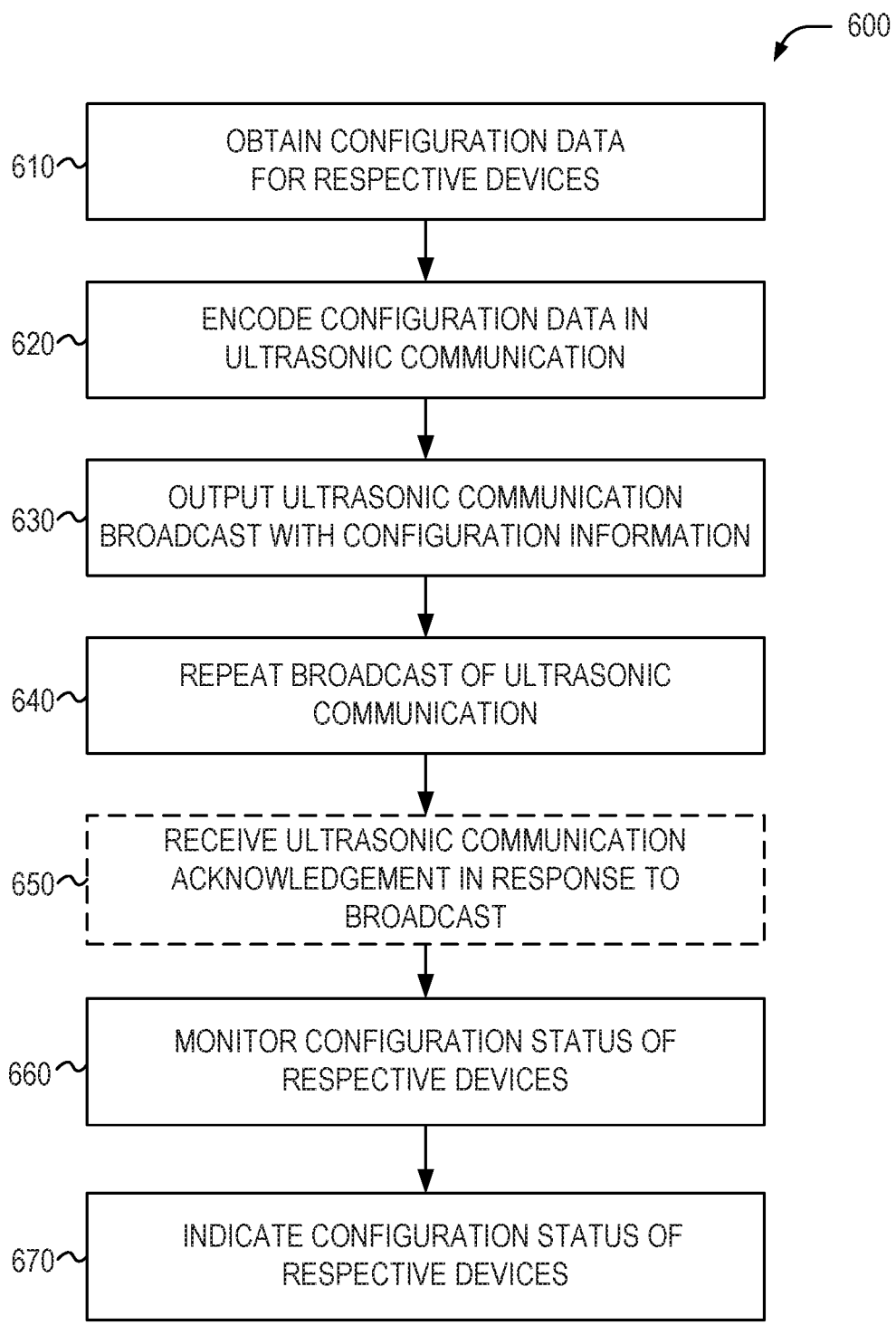
FIG. 6 illustrates a flowchart of a method performed at a configuration device for providing a configuration transmitted in an ultrasonic broadcast to respective configurable devices, according to an example.

FIG. 6 illustrates a flowchart 600 of a method performed at a configuration device (e.g., an onboarding computing device) for providing a configuration transmitted in a side-channel ultrasonic broadcast to respective configurable devices (e.g., IoT devices), according to an example. However, it will be understood that the following techniques may be modified to implement additional processing actions or features described above (including with the assistance of other devices, systems, or human-assisted activities).

As shown, the flowchart 600 includes operations performed at the configuration device for obtaining configuration data for respective configurable devices (operation 610), and encoding this configuration data in one or more ultrasonic communications (operation 620). Various modulation and data compression techniques may be used to encode the data in the ultrasonic audio signal. The flowchart 600 continues operations at the configuration device with the broadcast of the ultrasonic communication that includes the configuration information (operation 630), including in some examples, a repeating broadcast of this ultrasonic communication (operation 640).

As an optional operation, in response to the receipt of the ultrasonic communication broadcast, the configurable device may respond with an ultrasonic communication acknowledgement that may be received at the configuration device (operation 650). In a further example, the acknowledgement can be provided from the configurable device over a communication network such as the newly on-boarded network. (For example, the configurable devices may respectively register with a backend logging server that notifies the configuration device when the respective devices are on-boarded). Additionally, the configuration device may monitor a configuration status of respective devices (operation 660), such as through the receipt of device acknowledgements, or monitoring of registration for the respective devices with a network. The configuration device may indicate a configuration status of the respective devices (operation 670), such as through the use of a graphical user interface that displays an indications of provisioned and online devices.

Figure 7:
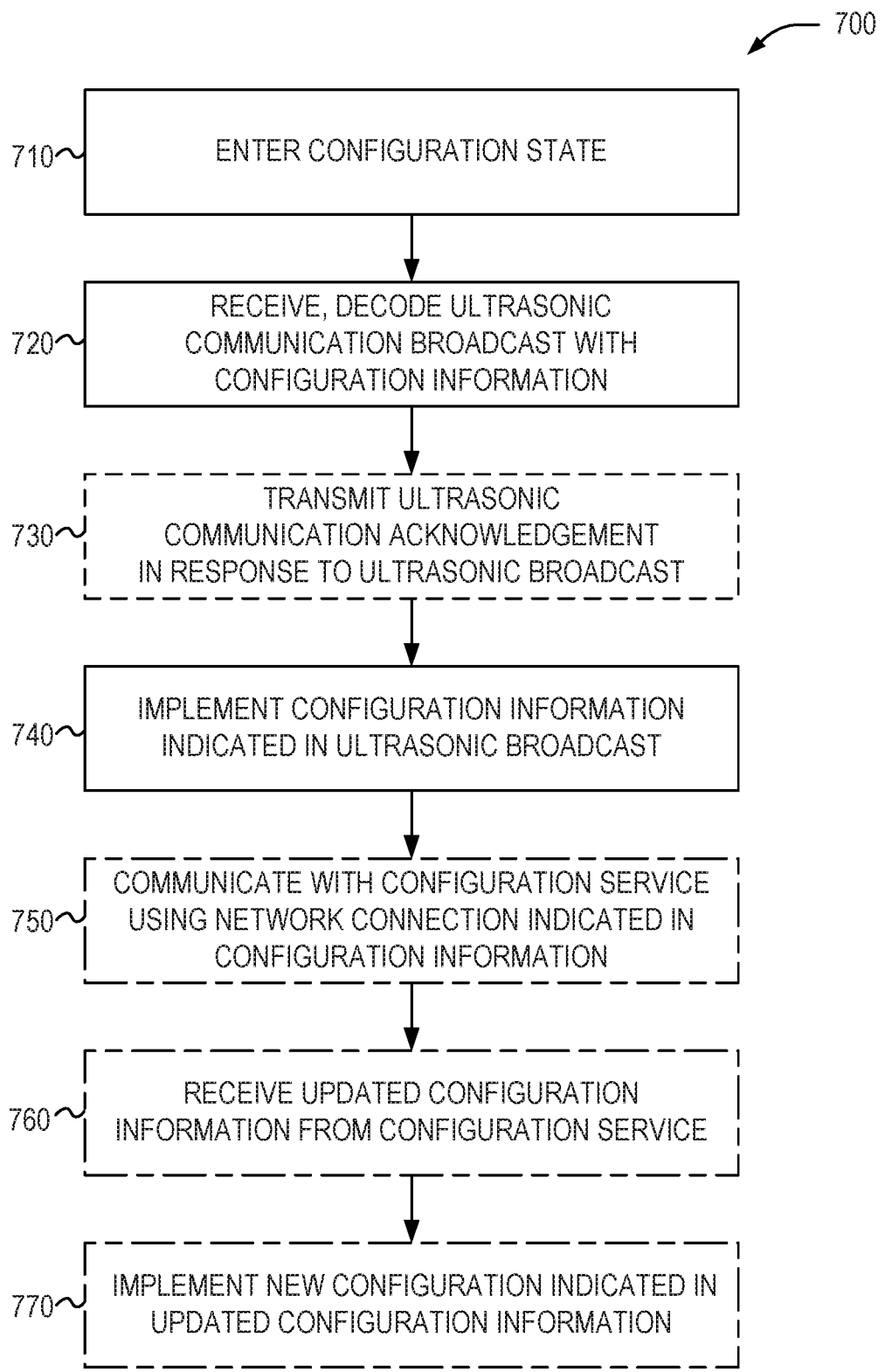
FIG. 7 illustrates a flowchart of a method performed at a configurable device for implementing a configuration received in an ultrasonic broadcast from a configuration device, according to an example.

FIG. 7 illustrates a flowchart 700 of a method performed at a configurable device for implementing a configuration received in a side channel ultrasonic broadcast from a configuration device. However, it will be understood that the following techniques may be modified to implement additional processing actions or features described above (including with the assistance of other devices, systems, or human-assisted activities).

As shown, the flowchart 700 includes operations performed at a configurable device for entering a configuration state (operation 710), such as a listening state that is factory-set or established in response to an audio or network communication. The flowchart 700 further depicts receipt and attempted decoding of an ultrasonic communication broadcast that includes configuration information (operation 720). In response to successful receipt (and, in some examples, successful decoding) of the ultrasonic communication broadcast, the configurable device may respond with an ultrasonic communication acknowledge to be received at the configuration device (operation 730).

The flowchart 700 continues operations with implementation of the configuration information indicated in the ultrasonic broadcast (operation 740). In a further example, where this configuration information is provided for access to a temporary, provisioning network, further operations may be performed to obtain updated (additional) configuration information. These operations may include communicating with a configuration service (operation 750), such as with use of a network address reference (e.g., URL or other pointer) provided in the initial ultrasonic broadcast; receiving updated configuration information from the configuration service (operation 760); and implementing a new configuration indicated in the updated configuration information (operation 770).

Figure 8:
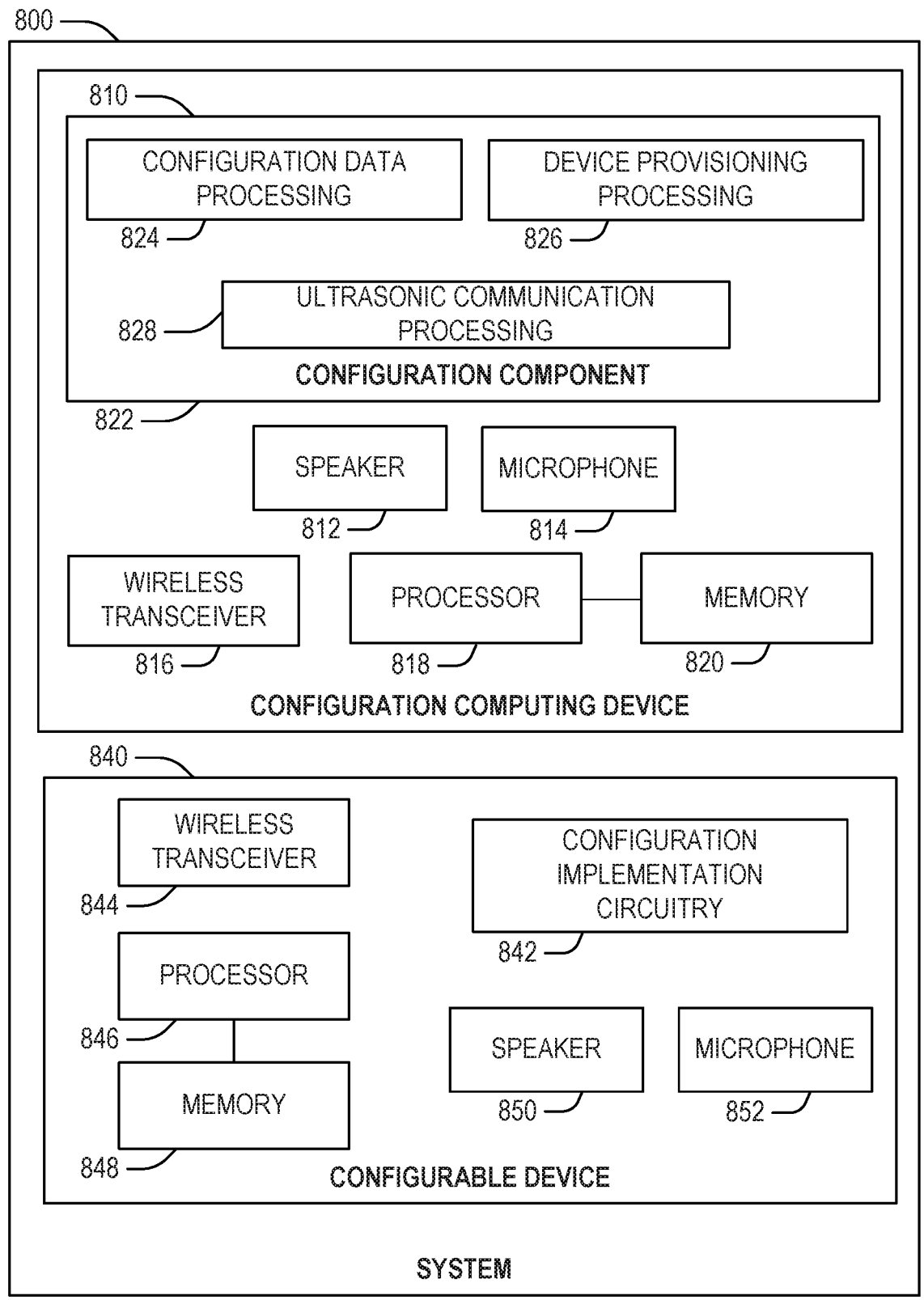
FIG. 8 illustrates a block diagram for an example system including a configuration computing device and a configurable device, for implementation of a provisioning and on-boarding configuration using ultrasonic communications, according to an example.

FIG. 8 is a block diagram illustrating an example system 800 including a configuration computing device 810 and a configurable device 840, implementing circuitry and structural electronic components for implementation of the techniques described herein. In accordance with the previous described configurations, the system 800 may include devices that are operably coupled (e.g., communicatively coupled) with one another, and it will be understood that additional components (other sensors, signal generation devices, and processing components) may be integrated at additional locations in the system. Further, the capabilities of system 800 may be integrated into additional or fewer devices and components that provide the operational features of the configuration computing device 810 and the configurable device 840.

The configuration computing device 810 is depicted as including a configuration component 822, in addition to a speaker 812, a microphone 814, a wireless transceiver 816, a processor 818 (e.g., a CPU), and memory 820 (e.g., volatile or non-volatile memory). In an example, the configuration component 822 may be provided from specialized hardware operating independent from the processor 818 and the memory 820; in other examples, the configuration component 822 may be software-configured hardware (e.g., circuitry) that is implemented with use of the processor 818 and the memory 820 (e.g., by instructions executed by the processor 818 and the memory 820).

The configurable device 840 is depicted as including: a wireless transceiver 844, a processor 846, memory 848, a speaker 850, a microphone 852, and configuration implementation circuitry 842. For example, the configuration implementation circuitry 842 may be used to implement configuration settings and decode ultrasonic audio signals captured by the microphone 852; generate and control an acknowledgment or response to the ultrasonic audio signals via additional ultrasonic audio signals transmitted by the speaker 850; and initiate operation of a primary or secondary wireless network configuration with use of the wireless transceiver 844. In an example, the configuration implementation circuitry 842 may be provided from specialized hardware operating independent from the processor 846 and the memory 848; in other examples, the configuration implementation circuitry 842 may be software-configured hardware (e.g., circuitry) that is implemented with use of the processor 846 and the memory 848 (e.g., by instructions executed by the processor 846 and the memory 848).

The configuration component 810 may include respective processing components, such as implemented through specially configured hardware (including with specialized circuitry or with software executed with use of the processor 818 and memory 820), to perform configuration data processing 824 (e.g., to implement commands, data values, and parameters, used to configure respective provisioning and onboarding configurations of respective configurable devices), device provisioning processing 826 (e.g., to determine, obtain, or receive configuration data or responses to the configuration data from the respective configurable devices), and ultrasonic communication processing 828 (e.g., to generate, modulate, and transmit ultrasonic audio signals, and to demodulate and decode data from received ultrasonic audio signals).

Although many of the previous examples were provided with reference to configuration of wireless communication network settings for Wi-Fi networks, it will be understood that other radio frequency communications and protocols may be provided to communicate, on-board, and provision respective configurable devices. Additionally, the output devices discussed herein to communicate the ultrasonic sound waves discussed herein may be paired with other speakers, microphones, audio systems, and the like, in a variety of configurations.

Figure 9:
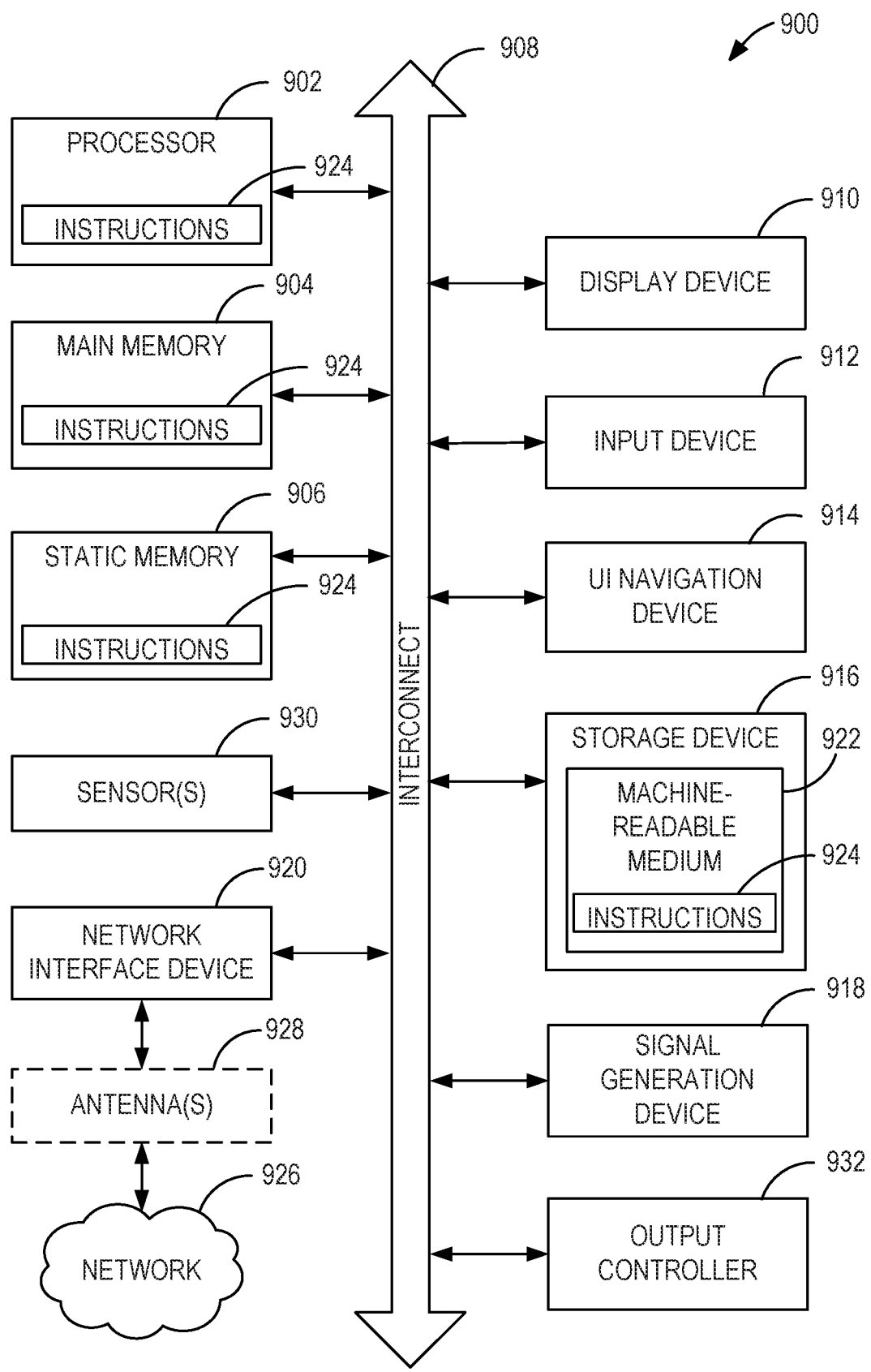
FIG. 9 illustrates a block diagram for an example computer system architecture upon which any one or more of the techniques (e.g., operations, processes, methods, and methodologies) discussed herein may be performed, according to an example.

FIG. 9 is a block diagram illustrating a machine in the example form of a computing system (e.g., computing device) 900, within which a set or sequence of instructions may be executed to cause the machine to perform any one of the methodologies discussed herein, according to an example. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via an interconnect 908 (e.g., a link, a bus, etc.). The computer system 900 may further include a video display unit 910, an alphanumeric input device 912 (e.g., a keyboard), and a user interface (UI) navigation device 914 (e.g., a mouse). In an example, the video display unit 910, input device 912 and UI navigation device 914 are incorporated into a touch screen display. The computer system 900 may additionally include a storage device 916 (e.g., a drive unit), a signal generation device 918 (e.g., a speaker), an output controller 932, a network interface device 920 (which may include or operably communicate with one or more antennas 928, transceivers, or other wireless communications hardware), and one or more sensors 930, such as a global positioning system (GPS) sensor, compass, accelerometer, location sensor, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

Specific examples of the machine-implemented processes that can be implemented with the computer system 900 (e.g., executed in connection with the processor 902 and memory 904, and operated with use of the network interface device 920, input device 912, signal generation device 918, and output controller 932) include a first set of electronic operations to process configuration data for a plurality of configurable devices (e.g., using the processor 902 and memory 904), encode the configuration data into an ultrasonic audio signal (e.g., using the processor 902 and memory 904), and output the ultrasonic audio signal (e.g., using the signal generation device 918 and output controller 932), to cause the configurable devices to implement a configuration based on the received ultrasonic signal. Another example includes a second set of electronic operations to receive an ultrasonic audio signal (e.g., using the network interface device 920 or the input device 912), decode configuration data from the ultrasonic audio signal (e.g., using the processor 902 and memory 904), and configure settings based on the configuration data decoded from the ultrasonic audio signal (e.g., using the processor 902 and memory 904).

While the machine-readable medium 922 is illustrated in an example to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 via an antenna

928 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a configuration computing device, comprising: a speaker; and processing circuitry to perform operations that: process configuration data for a plurality of configurable devices; encode the configuration data into an ultrasonic audio signal; and output the ultrasonic audio signal with the speaker; wherein the ultrasonic audio signal is emitted by the speaker to be received by the plurality of configurable devices, to cause the plurality of the configurable devices to implement a configuration based on the configuration data.

In Example 2, the subject matter of Example 1 optionally includes wherein the operations to process the configuration data for the plurality of configurable devices include operations to obtain the configuration data, and wherein the configuration data includes network connection information, the network connection information used to configure the plurality of configurable devices to connect to a network.

In Example 3, the subject matter of Example 2 optionally includes wherein the network is a wireless local area network, wherein the network connection information includes an SSID name and pre-shared security key, wherein the SSID name and the pre-shared security key is used to configure the plurality of configurable devices to establish a connection with the wireless local area network, and wherein the wireless local area network operates according to a standard from an IEEE 802.11 standards family.

In Example 4, the subject matter of any one or more of Examples 2-3 optionally include wherein the network is a wireless network that operates according to a defined wireless local area network (WLAN) or wireless personal area network (WPAN) standard, wherein the configuration data includes a reference to a provisioning server, the reference including a network address of the provisioning server, wherein the network connection information is used by the plurality of configurable devices to connect to the provisioning server via the wireless network, and wherein the provisioning server provides to the plurality of configurable devices, in response to access via the reference, a second set of network connection information, wherein the second set of network connection information is used by the plurality of configurable devices to connect to a second wireless local area network.

In Example 5, the subject matter of any one or more of Examples 1-4 optionally include wherein the operations to output the ultrasonic audio signal with the speaker include operations to emit the ultrasonic audio signal for a plurality of defined times.

In Example 6, the subject matter of any one or more of Examples 1-5 optionally include a microphone, wherein the processing circuitry further performs operations that: capture a response ultrasonic audio signal with the microphone, in response to the output of the ultrasonic audio signal with the speaker; wherein the response ultrasonic audio signal is emitted by a particular device of the plurality of configurable devices, and wherein the response ultrasonic audio signal indicates that the particular device has received and implemented the configuration data.

In Example 7, the subject matter of Example 6 optionally includes a wireless transceiver communicatively coupled to the processing circuitry, wherein the processing circuitry further performs operations that: receive the configuration data from a remote computing device via the wireless transceiver; and transmit a configuration status message to the remote computing device, wherein the configuration status message indicates that the particular device has received and implemented the configuration data.

In Example 8, the subject matter of any one or more of Examples 1-7 optionally include a display screen, wherein the processing circuitry includes a processor and a memory, and wherein the processing circuitry further performs operations that: generate a graphical user interface to output with the display screen, wherein the operations to encode the configuration data and to output the ultrasonic audio signal occur in response to input received with the graphical user interface.

In Example 9, the subject matter of Example 8 optionally includes wherein the processing circuitry further performs operations that: monitor a configuration status of respective devices of the plurality of configurable devices; wherein an indication of the configuration status of the respective devices is displayed within the graphical user interface, and wherein the indication of the configuration status indicates whether the respective devices have received and implemented the configuration data.

In Example 10, the subject matter of any one or more of Examples 1-9 optionally include wherein the ultrasonic audio signal is emitted by the speaker in a frequency approximately at or above 18 kHz.

Example 11 is a configurable device, comprising: a microphone; and processing circuitry to perform operations that: receive an ultrasonic audio signal with the microphone; decode configuration data from the ultrasonic audio signal; and configure settings of the configurable device based on the configuration data decoded from the ultrasonic audio signal.

In Example 12, the subject matter of Example 11 optionally includes a wireless transceiver, wherein the processing circuitry further performs operations that: configure the configurable device to establish a connection with a wireless local area network using the wireless transceiver; wherein the connection to the wireless local area network uses network connection information indicated in the configuration data.

In Example 13, the subject matter of Example 12 optionally includes wherein the network connection information includes an SSID name and pre-shared security key used to establish the connection with the wireless local area network, and wherein the wireless local area network operates according to a standard from an IEEE 802.11 standards family.

In Example 14, the subject matter of Example 13 optionally includes wherein the processing circuitry further performs operations that: connect to a provisioning server via the wireless local area network using the network connection information, wherein the configuration data includes a reference to the provisioning server, and receive, from the provisioning server in response to a network connection using the reference, a second set of network connection information, and re-configure the configurable device to use the second set of network connection information to connect to a second wireless local area network.

In Example 15, the subject matter of Example 14 optionally includes wherein the processing circuitry further performs operations that: request, from the provisioning server via the second wireless local area network, updated configuration data; receive, from the from the provisioning server in response to the request, an updated set of network connection information; and re-configure the configurable device to use the updated set of network connection information.

In Example 16, the subject matter of any one or more of Examples 14-15 optionally include wherein the second set of network connection information includes one or more of: a SSID name, security settings, a security keys or certificate, IP address settings, DHCP settings, DNS settings, a certificate chain, or an address of a remote logging service.

In Example 17, the subject matter of any one or more of Examples 11-16 optionally include a speaker, wherein the processing circuitry further performs operations that: emit with the speaker, in response to successful configuration of the settings of the configurable device, a response ultrasonic audio signal.

In Example 18, the subject matter of Example 17 optionally includes wherein the response ultrasonic audio signal indicates that the configurable device has successfully received and implemented the configuration data.

In Example 19, the subject matter of any one or more of Examples 17-18 optionally include wherein the response ultrasonic audio signal indicates that the configurable device has unsuccessfully received or implemented the configuration data.

In Example 20, the subject matter of any one or more of Examples 17-19 optionally include wherein the ultrasonic audio signal is emitted by the configurable device in a frequency approximately at or above 18 kHz.

In Example 21, the subject matter of any one or more of Examples 11-20 optionally include a network transceiver, wherein the processing circuitry further performs operations that: transmit, to the configuration device via the network transceiver, an indication of a configuration status of the configurable device.

Example 22 is a system, comprising: a configuration device, comprising: a speaker; and processing circuitry to perform operations that: process configuration data for a plurality of configurable devices; encode the configuration data into an ultrasonic audio signal; and output the ultrasonic audio signal with the speaker; a configurable device, comprising: a microphone; wireless network communication circuitry; and processing circuitry to: receive the ultrasonic audio signal output from the configuration device; decode the configuration data from the ultrasonic audio signal; and configure wireless network connection settings of the configurable device using the configuration data decoded from the ultrasonic audio signal; and establish a wireless network connection with the wireless network communication circuitry using the wireless network connection settings.

In Example 23, the subject matter of Example 22 optionally includes wherein the configuration data includes a reference of a service, and wherein the processing circuitry of the configurable device is further is to configure the configurable device to connect to a service accessible with the reference, using the wireless network connection established via the wireless network communication circuitry.

In Example 24, the subject matter of Example 23 optionally includes a provisioning server, comprising processing circuitry to: receive a request from the configurable device, the request provided to the service accessible with the reference; and transmit, in response to the request, secondary configuration data to the configurable device; wherein the processing circuitry of the configurable device is further to: re-configure the wireless network connection settings of the configurable device using the secondary configuration data obtained from the provisioning server; and establish a second wireless network connection with the wireless network communication circuitry using the wireless network connection settings.

In Example 25, the subject matter of Example 24 optionally includes a data server, wherein the data server is accessible via the second wireless network connection; wherein the processing circuitry of the configurable device is further to: configure the configurable device to communicate data with the data server, using the configuration data decoded from the ultrasonic audio signal or the secondary configuration data obtained from the provisioning server; and transmit data from the configurable device to the data server via the second wireless network connection.

Example 26 is at least one device readable storage medium, comprising a plurality of instructions that, responsive to being executed with processing circuitry of a configuration computing device, cause the configuration computing device to perform operations that: process configuration data for a plurality of configurable devices; encode the configuration data into an ultrasonic audio signal; and output the ultrasonic audio signal with a speaker; wherein the ultrasonic audio signal is to be received by the plurality of configurable devices, to cause the plurality of the configurable devices to implement a configuration based on the configuration data.

In Example 27, the subject matter of Example 26 optionally includes wherein the operations to process the configuration data for the plurality of configurable devices include operations to obtain the configuration data, and wherein the configuration data includes network connection information, the network connection information used to configure the plurality of configurable devices to connect to a network.

In Example 28, the subject matter of Example 27 optionally includes wherein the network is a wireless local area network, wherein the network connection information includes an SSID name and pre-shared security key, wherein the SSID name and the pre-shared security key is used to configure the plurality of configurable devices to establish a connection with the wireless local area network, and wherein the wireless local area network operates according to a standard from an IEEE 802.11 standards family.

In Example 29, the subject matter of any one or more of Examples 27-28 optionally include wherein the network is a wireless network that operates according to a defined wireless local area network (WLAN) or wireless personal area network (WPAN) standard, wherein the configuration data includes a reference to a provisioning server, the reference including a network address of the provisioning server, wherein the network connection information is used by the plurality of configurable devices to connect to the provisioning server via the wireless network, and wherein the provisioning server provides to the plurality of configurable devices, in response to access via the reference, a second set of network connection information, wherein the second set of network connection information is used by the plurality of configurable devices to connect to a second wireless local area network.

In Example 30, the subject matter of any one or more of Examples 26-29 optionally include wherein the operations to output the ultrasonic audio signal with the speaker include operations to emit the ultrasonic audio signal for a plurality of defined times.

In Example 31, the subject matter of any one or more of Examples 26-30 optionally include the instructions to further cause the configuration computing device to perform operations that: capture a response ultrasonic audio signal with a microphone, in response to the output of the ultrasonic audio signal with the speaker; wherein the response ultrasonic audio signal is emitted by a particular device of the plurality of configurable devices, and wherein the response ultrasonic audio signal indicates that the particular device has received and implemented the configuration data.

In Example 32, the subject matter of Example 31 optionally includes the instructions to further cause the configuration computing device to perform operations that: receive the configuration data from a remote computing device via a wireless transceiver; and transmit a configuration status message to the remote computing device, wherein the configuration status message indicates that the particular device has received and implemented the configuration data.

In Example 33, the subject matter of any one or more of Examples 26-32 optionally include the instructions to further cause the configuration computing device to perform operations that: generate a graphical user interface to output, wherein the operations to encode the configuration data and to output the ultrasonic audio signal occur in response to input received with the graphical user interface.

In Example 34, the subject matter of Example 33 optionally includes the instructions to further cause the configuration computing device to perform operations that: monitor a configuration status of respective devices of the plurality of configurable devices; wherein an indication of the configuration status of the respective devices is displayed within the graphical user interface, and wherein the indication of the configuration status indicates whether the respective devices have received and implemented the configuration data.

In Example 35, the subject matter of any one or more of Examples 26-34 optionally include wherein the ultrasonic audio signal is emitted by the speaker in a frequency approximately at or above 18 kHz.

Example 36 is at least one device readable storage medium, comprising a plurality of instructions that, responsive to being executed with circuitry of a configurable device, cause the configurable device to perform operations that: receive an ultrasonic audio signal; decode configuration data from the ultrasonic audio signal; and configure settings of the configurable device based on the configuration data decoded from the ultrasonic audio signal.

In Example 37, the subject matter of Example 36 optionally includes the instructions to further cause the configurable device to perform operations that: establish a connection with a wireless local area network using a wireless transceiver; wherein the connection to the wireless local area network uses network connection information indicated in the configuration data.

In Example 38, the subject matter of Example 37 optionally includes wherein the network connection information includes an SSID name and pre-shared security key used to establish the connection with the wireless local area network, and wherein the wireless local area network operates according to a standard from an IEEE 802.11 standards family.

In Example 39, the subject matter of Example 38 optionally includes the instructions to further cause the configurable device to perform operations that: connect to a provisioning server via the wireless local area network using the network connection information, wherein the configuration data includes a reference to the provisioning server, and receive, from the provisioning server in response to a network connection using the reference, a second set of network connection information, and re-configure the configurable device to use the second set of network connection information to connect to a second wireless local area network.

In Example 40, the subject matter of Example 39 optionally includes the instructions to further cause the configurable device to perform operations that: request, from the provisioning server via the second wireless local area network, updated configuration data; receive, from the from the provisioning server in response to the request, an updated set of network connection information; and re-configure the configurable device to use the updated set of network connection information.

In Example 41, the subject matter of any one or more of Examples 39-40 optionally include wherein the second set of network connection information includes one or more of: a SSID name, security settings, a security keys or certificate, IP address settings, DHCP settings, DNS settings, a certificate chain, or an address of a remote logging service.

In Example 42, the subject matter of any one or more of Examples 36-41 optionally include emit with a speaker, in response to successful configuration of the settings of the configurable device, a response ultrasonic audio signal.

In Example 43, the subject matter of Example 42 optionally includes wherein the response ultrasonic audio signal indicates that the configurable device has successfully received and implemented the configuration data.

In Example 44, the subject matter of any one or more of Examples 42-43 optionally include wherein the response ultrasonic audio signal indicates that the configurable device has unsuccessfully received or implemented the configuration data.

In Example 45, the subject matter of any one or more of Examples 42-44 optionally include wherein the ultrasonic audio signal is emitted by the configurable device in a frequency approximately at or above 18 kHz.

In Example 46, the subject matter of any one or more of Examples 36-45 optionally include the instructions to further cause the configurable device to perform operations that: transmit, to the configuration device, an indication of a configuration status of the configurable device.

Example 47 is a method comprising electronic operations, which when performed by circuitry of a configuration computing device, causes the configuration computing device to perform the electronic operations including: processing configuration data for a plurality of configurable devices; encoding the configuration data into an ultrasonic audio signal; and outputting the ultrasonic audio signal with a speaker; wherein the ultrasonic audio signal is to be received by the plurality of configurable devices, to cause the plurality of the configurable devices to implement a configuration based on the configuration data.

In Example 48, the subject matter of Example 47 optionally includes wherein the operations to process the configuration data for the plurality of configurable devices include operations to obtain the configuration data, and wherein the configuration data includes network connection information, the network connection information used to configure the plurality of configurable devices to connect to a network.

In Example 49, the subject matter of Example 48 optionally includes wherein the network is a wireless local area network, wherein the network connection information includes an SSID name and pre-shared security key, wherein the SSID name and the pre-shared security key is used to configure the plurality of configurable devices to establish a connection with the wireless local area network, and wherein the wireless local area network operates according to a standard from an IEEE 802.11 standards family.

In Example 50, the subject matter of any one or more of Examples 48-49 optionally include wherein the network is a wireless network that operates according to a defined wireless local area network (WLAN) or wireless personal area network (WPAN) standard, wherein the configuration data includes a reference to a provisioning server, the reference including a network address of the provisioning server, wherein the network connection information is used by the plurality of configurable devices to connect to the provisioning server via the wireless network, and wherein the provisioning server provides to the plurality of configurable devices, in response to access via the reference, a second set of network connection information, wherein the second set of network connection information is used by the plurality of configurable devices to connect to a second wireless local area network.

In Example 51, the subject matter of any one or more of Examples 47-50 optionally include wherein the operations to output the ultrasonic audio signal with the speaker include operations to emit the ultrasonic audio signal for a plurality of defined times.

In Example 52, the subject matter of any one or more of Examples 47-51 optionally include capturing a response ultrasonic audio signal with a microphone, in response to the output of the ultrasonic audio signal with the speaker; wherein the response ultrasonic audio signal is emitted by a particular device of the plurality of configurable devices, and wherein the response ultrasonic audio signal indicates that the particular device has received and implemented the configuration data.

In Example 53, the subject matter of Example 52 optionally includes receiving the configuration data from a remote computing device via a wireless transceiver; and transmitting a configuration status message to the remote computing device, wherein the configuration status message indicates that the particular device has received and implemented the configuration data.

In Example 54, the subject matter of any one or more of Examples 47-53 optionally include generating a graphical user interface to output, wherein the operations to encode the configuration data and to output the ultrasonic audio signal occur in response to input received with the graphical user interface.

In Example 55, the subject matter of Example 54 optionally includes monitoring a configuration status of respective devices of the plurality of configurable devices; wherein an indication of the configuration status of the respective devices is displayed within the graphical user interface, and wherein the indication of the configuration status indicates whether the respective devices have received and implemented the configuration data.

In Example 56, the subject matter of any one or more of Examples 47-55 optionally include wherein the ultrasonic audio signal is emitted by the speaker in a frequency above 18 kHz.

Example 57 is a method comprising electronic operations, which when performed by circuitry of a configurable device, causes the configurable device to perform the electronic operations including: receiving an ultrasonic audio signal; decoding configuration data from the ultrasonic audio signal; and configuring settings of the configurable device based on the configuration data decoded from the ultrasonic audio signal.

In Example 58, the subject matter of Example 57 optionally includes establishing a connection with a wireless local area network using a wireless transceiver; wherein the connection to the wireless local area network uses network connection information indicated in the configuration data.

In Example 59, the subject matter of Example 58 optionally includes wherein the network connection information includes an SSID name and pre-shared security key used to establish the connection with the wireless local area network, and wherein the wireless local area network operates according to a standard from an IEEE 802.11 standards family.

In Example 60, the subject matter of Example 59 optionally includes connecting to a provisioning server via the wireless local area network using the network connection information, wherein the configuration data includes a reference to the provisioning server, and receiving, from the provisioning server in response to a network connection using the reference, a second set of network connection information, and re-configuring the configurable device to use the second set of network connection information to connect to a second wireless local area network.

In Example 61, the subject matter of Example 60 optionally includes requesting, from the provisioning server via the second wireless local area network, updated configuration data; receiving, from the from the provisioning server in response to the request, an updated set of network connection information; and re-configuring the configurable device to use the updated set of network connection information.

In Example 62, the subject matter of any one or more of Examples 60-61 optionally include wherein the second set of network connection information includes one or more of: a SSID name, security settings, a security keys or certificate, IP address settings, DHCP settings, DNS settings, a certificate chain, or an address of a remote logging service.

In Example 63, the subject matter of any one or more of Examples 57-62 optionally include emitting with a speaker, in response to successful configuration of the settings of the configurable device, a response ultrasonic audio signal.

In Example 64, the subject matter of Example 63 optionally includes wherein the response ultrasonic audio signal indicates that the configurable device has successfully received and implemented the configuration data.

In Example 65, the subject matter of any one or more of Examples 63-64 optionally include wherein the response ultrasonic audio signal indicates that the configurable device has unsuccessfully received or implemented the configuration data.

In Example 66, the subject matter of any one or more of Examples 63-65 optionally include wherein the ultrasonic audio signal is emitted by the configurable device in a frequency approximately at or above 18 kHz.

In Example 67, the subject matter of any one or more of Examples 57-66 optionally include transmitting, to the configuration device, an indication of a configuration status of the configurable device.

Example 68 is at least one machine readable medium including instructions, which when executed by a computing system, cause the computing system to perform any of the methods of Examples 47-67.

Example 69 is an apparatus comprising means for performing any of the methods of Examples 47-67.

Example 70 is an apparatus, comprising: means for processing configuration data for a plurality of configurable devices; means for encoding the configuration data into an ultrasonic audio signal; and means for outputting the ultrasonic audio signal, wherein the ultrasonic audio signal is to be received by the plurality of configurable devices, to cause the plurality of the configurable devices to implement a configuration based on the configuration data.

In Example 71, the subject matter of Example 70 optionally includes means for obtaining the configuration data, wherein the configuration data includes network connection information, the network connection information used to configure the plurality of configurable devices to connect to a network.

In Example 72, the subject matter of any one or more of Examples 70-71 optionally include means for emitting the ultrasonic audio signal for a plurality of defined times.

In Example 73, the subject matter of any one or more of Examples 70-72 optionally include means for capturing a response ultrasonic audio signal with a microphone, in response to the outputting of the ultrasonic audio signal, wherein the response ultrasonic audio signal is emitted by a particular device of the plurality of configurable devices, and wherein the response ultrasonic audio signal indicates that the particular device has received and implemented the configuration data.

In Example 74, the subject matter of Example 73 optionally includes means for receiving the configuration data from a remote computing device via a wireless transceiver; and means for transmitting a configuration status message to the remote computing device, wherein the configuration status message indicates that the particular device has received and implemented the configuration data.

In Example 75, the subject matter of any one or more of Examples 70-74 optionally include means for generating a graphical user interface to output, the means to encode the configuration data and to output the ultrasonic audio signal in response to input received with the graphical user interface.

In Example 76, the subject matter of Example 75 optionally includes monitoring a configuration status of respective devices of the plurality of configurable devices; wherein an indication of the configuration status of the respective devices is displayed within the graphical user interface, and wherein the indication of the configuration status indicates whether the respective devices have received and implemented the configuration data.

Example 77 is an apparatus, comprising: means for receiving an ultrasonic audio signal; means for decoding configuration data from the ultrasonic audio signal; and means for configuring settings of the apparatus based on the configuration data decoded from the ultrasonic audio signal.

In Example 78, the subject matter of Example 77 optionally includes means for establishing a connection with a wireless local area network using a wireless transceiver, wherein the connection to the wireless local area network uses network connection information indicated in the configuration data.

In Example 79, the subject matter of Example 78 optionally includes means for connecting to a provisioning server via the wireless local area network using the network connection information, wherein the configuration data includes a reference to the provisioning server, and means for receiving, from the provisioning server in response to a network connection using the reference, a second set of network connection information, and means for re-configuring the apparatus to use the second set of network connection information to connect to a second wireless local area network.

In Example 80, the subject matter of Example 79 optionally includes means for requesting, from the provisioning server via the second wireless local area network, updated configuration data; means for receiving, from the from the provisioning server in response to the request, an updated set of network connection information; and means for re-configuring the apparatus to use the updated set of network connection information.

In Example 81, the subject matter of any one or more of Examples 77-80 optionally include means for emitting, in response to successful configuration of the settings of the apparatus, a response ultrasonic audio signal.

In Example 82, the subject matter of any one or more of Examples 77-81 optionally include means for transmitting an indication of a configuration status of the apparatus.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A configuration computing device, comprising:
a speaker; and
processing circuitry to perform operations that:
  process configuration data for a plurality of configurable devices, wherein the configuration data includes a reference to a provisioning server, the reference including a network address of the provisioning server, and wherein the configuration data includes network connection information, the network connection information used to configure the plurality of configurable devices to connect to an initialization network;
  encode the configuration data into a first ultrasonic audio signal, wherein the first ultrasonic audio signal is to be received by the plurality of configurable devices, to cause each respective device of the plurality of configurable devices to decode the configuration data and implement a configuration based on the configuration data;
  output the first ultrasonic audio signal with the speaker, the output of the first ultrasonic audio signal to cause each respective device of the plurality of configurable devices to be placed in a provisioned state using the configuration, wherein the provisioned state enables the plurality of configurable devices to access at least one service available to the configuration computing device, wherein the provisioning server provides a second set of network connection information to the plurality of configurable devices, in response to access to the initialization network via the reference, wherein the second set of network connection information is used by the plurality of configurable devices to connect to a second wireless local area network, wherein the initialization network is separate from the second wireless local area network and allows the plurality of configurable devices to access the provisioning server, and wherein the second wireless local area network connection allows the plurality of configurable devices access to a service unavailable on the initialization network; and
  receive an acknowledgement from each respective device of the plurality of configurable devices via a second response ultrasonic audio signal, the acknowledgement to indicate a successful implementation of the configuration based on the configuration data.

2. The configuration computing device of claim 1, wherein the initialization network is a wireless local area network, wherein the initialization network connection information includes an SSID name and pre-shared security key, wherein the SSID name and the pre-shared security key is used to configure the plurality of configurable devices to establish a connection with the initialization network, and wherein the initialization network operates according to a standard from an IEEE 802.11 standards family.

3. The configuration computing device of claim 1, wherein the initialization network is a wireless network that operates according to a defined wireless local area network (WLAN) or wireless personal area network (WPAN) standard.

4. The configuration computing device of claim 1, wherein the operations to output the first ultrasonic audio signal with the speaker include operations to emit the first ultrasonic audio signal for a plurality of defined times.

5. The configuration computing device of claim 1, further comprising a microphone, wherein the processing circuitry further performs operations that:
  capture the second response ultrasonic audio signal with the microphone, in response to the output of the first ultrasonic audio signal with the speaker;
wherein the second response ultrasonic audio signal is emitted by a particular device of the plurality of configurable devices, and wherein the second response ultrasonic audio signal indicates that the particular device has received and implemented the configuration data.

6. The configuration computing device of claim 5, further comprising a wireless transceiver communicatively coupled to the processing circuitry, wherein the processing circuitry further performs operations that:
  receive the configuration data from a remote computing device via the wireless transceiver; and
  transmit a configuration status message to the remote computing device, wherein the configuration status message indicates that the particular device has received and implemented the configuration data.

7. The configuration computing device of claim 1, further comprising:
  a display screen, wherein the processing circuitry includes a processor and a memory, and wherein the processing circuitry further performs operations that:
    generate a graphical user interface to output with the display screen, wherein the operations to encode the configuration data and to output the first ultrasonic audio signal occur in response to input received with the graphical user interface.

8. The configuration computing device of claim 7, wherein the processing circuitry further performs operations that:
  monitor a configuration status of respective devices of the plurality of configurable devices;
wherein an indication of the configuration status of the respective devices is displayed within the graphical user interface, and wherein the indication of the configuration status indicates whether the respective devices have received and implemented the configuration data.

9. The configuration computing device of claim 1, wherein the first ultrasonic audio signal is emitted by the speaker in a frequency at or above 18 kHz.

10. The configuration computing device of claim 1, wherein the second set of network connection information includes one or more of: a SSID name, security settings, security keys, or certificate, IP address settings, DHCP settings, a certificate chain, or an address of a remote logging service, and wherein the processing circuitry further performs operations that:
  request from the provisioning server via the second wireless local area network, updated configuration data;
  receive, from the provisioning server in response to the request, an updated set of network configuration information; and re-configure the configurable device to use the updated set of network connection information.

11. At least one non-transitory device readable storage medium, comprising a plurality of instructions that, responsive to being executed with processing circuitry of a configuration computing device, cause the configuration computing device to perform operations that:
    process configuration data for a plurality of configurable devices, wherein the configuration data includes a reference to a provisioning server, the reference including a network address of the provisioning server, and wherein the configuration data includes network connection information, the network connection information used to configure the plurality of configurable devices to connect to an initialization network;
    encode the configuration data into a first ultrasonic audio signal, wherein the first ultrasonic audio signal is to be received by the plurality of configurable devices, to cause each respective device of the plurality of configurable devices to decode the configuration data and implement a configuration based on the configuration data;
    output the first ultrasonic audio signal with a speaker, the output of the first ultrasonic audio signal to cause each respective device of the plurality of configurable devices to enter a provisioned state using the configuration, wherein the provisioned state enables each respective device of the plurality of configurable devices to access at least one service available to the configuration computing device, wherein the provisioning server provides a second set of network connection information to the plurality of configurable devices, in response to access to the initialization network via the reference, wherein the second set of network connection information is used by the plurality of configurable devices to connect to a second wireless local area network, wherein the initialization network is separate from the second wireless local area network and allows the plurality of configurable devices to access the provisioning server, and wherein the second wireless local area network connection allows the plurality of configurable devices access to a service unavailable on the initialization network; and
    receive an acknowledgement from each respective device of the plurality of configurable devices via a second response ultrasonic audio signal, the acknowledgement to indicate a successful implementation of the configuration based on the configuration data.

12. The device readable storage medium of claim 11, wherein the initialization network is a wireless local area network, wherein the initialization network connection information includes an SSID name and pre-shared security key, wherein the SSID name and the pre-shared security key is used to configure the plurality of configurable devices to establish a connection with the initialization network, and wherein the initialization network operates according to a standard from an IEEE 802.11 standards family.

13. The device readable storage medium of claim 11, wherein the initialization network is a wireless network that operates according to a defined wireless local area network (WLAN) or wireless personal area network (WPAN) standard.

14. The device readable storage medium of claim 11, wherein the operations to output the first ultrasonic audio signal with the speaker include operations to emit the first ultrasonic audio signal for a plurality of defined times.

15. The device readable storage medium of claim 11, the instructions to further cause the configuration computing device to perform operations that:
    capture the second response ultrasonic audio signal with a microphone, in response to the output of the first ultrasonic audio signal with the speaker;
    wherein the second response ultrasonic audio signal is emitted by a particular device of the plurality of configurable devices, and wherein the second response ultrasonic audio signal indicates that the particular device has received and implemented the configuration data.

16. The device readable storage medium of claim 15, the instructions to further cause the configuration computing device to perform operations that:
    receive the configuration data from a remote computing device via a wireless transceiver; and
    transmit a configuration status message to the remote computing device, wherein the configuration status message indicates that the particular device has received and implemented the configuration data.

17. The device readable storage medium of claim 11, the instructions to further cause the configuration computing device to perform operations that:
    generate a graphical user interface to output, wherein the operations to encode the configuration data and to output the first ultrasonic audio signal occur in response to input received with the graphical user interface.

18. The device readable storage medium of claim 17, the instructions to further cause the configuration computing device to perform operations that:
    monitor a configuration status of respective devices of the plurality of configurable devices;
    wherein an indication of the configuration status of the respective devices is displayed within the graphical user interface, and wherein the indication of the configuration status indicates whether the respective devices have received and implemented the configuration data.

19. The device readable storage medium of claim 11, wherein the first ultrasonic audio signal is emitted by the speaker in a frequency at or above 18 kHz.

20. The device readable medium of claim 11, wherein the second set of network connection information includes one or more of: a SSID name, security settings, security keys, or certificate, IP address settings, DHCP settings, a certificate chain, or an address of a remote logging service, and wherein the instructions further cause the configuration computing device to perform operations that:
    request from the provisioning server via the second wireless local area network, updated configuration data;
    receive, from the provisioning server in response to the request, an updated set of network configuration information; and
    re-configure the configurable device to use the updated set of network connection information.

21. A method comprising electronic operations, which when performed by circuitry of a configuration computing device, causes the configuration computing device to perform the electronic operations including:
    processing configuration data for a plurality of configurable devices, wherein the configuration data includes a reference to a provisioning server, the reference including a network address of the provisioning server, and wherein the configuration data includes network connection information, the network connection information used to configure the plurality of configurable devices to connect to an initialization network;

encoding the configuration data into a first ultrasonic audio signal, wherein the first ultrasonic audio signal is to be received by the plurality of configurable devices, to cause each respective device of the plurality of configurable devices to decode the configuration data and implement a configuration based on the configuration data;

outputting the first ultrasonic audio signal with a speaker, the outputting of the first ultrasonic audio signal to cause each respective device of the plurality of configurable devices to enter a provisioned state using the configuration, wherein the provisioned state enables each respective device of the plurality of configurable devices to access at least one service available to the configuration computing device, wherein the provisioning server provides a second set of network connection information to the plurality of configurable devices, in response to access to the initialization network via the reference, wherein the second set of network connection information is used by the plurality of configurable devices to connect to a second wireless local area network, wherein the initialization network is separate from the second wireless local area network and allows the plurality of configurable devices to access the provisioning server, and wherein the second wireless local area network connection allows the plurality of configurable devices access to a service unavailable on the initialization network; and receiving an acknowledgement from each respective device of the plurality of configurable devices via a second response ultrasonic audio signal, the acknowledgement to indicate a successful implementation of the configuration based on the configuration data.

22. The method of claim 21, wherein the initialization network is a wireless local area network, wherein the initialization network connection information includes an SSID name and pre-shared security key, wherein the SSID name and the pre-shared security key is used to configure the plurality of configurable devices to establish a connection with the initialization network, and wherein the initialization network operates according to a standard from an IEEE 802.11 standards family.

23. The method of claim 21, wherein the initialization network is a wireless network that operates according to a defined wireless local area network (WLAN) or wireless personal area network (WPAN) standard.

24. The method of claim 21, wherein the operations to output the first ultrasonic audio signal with the speaker include operations to emit the first ultrasonic audio signal for a plurality of defined times.

25. The method of claim 21, wherein the second set of network connection information includes one or more of: a SSID name, security settings, security keys, or certificate, IP address settings, DHCP settings, a certificate chain, or an address of a remote logging service, and wherein the electronic operations further causes the configuration computing device to perform electronic operations including:

requesting from the provisioning server via the second wireless local area network, updated configuration data;

receiving, from the provisioning server in response to the request, an updated set of network configuration information; and re-configuring the configurable device to use the updated set of network connection information.

* * * * *